United States Patent [19]

Ando

[11] Patent Number: 4,652,504
[45] Date of Patent: Mar. 24, 1987

[54] SECONDARY BATTERY HAVING A SEPARATOR

[75] Inventor: Yasuo Ando, Tokyo, Japan

[73] Assignee: Kabushiki Kaisha Meidensha, Tokyo, Japan

[21] Appl. No.: 818,998

[22] Filed: Jan. 13, 1986

Related U.S. Application Data

[63] Continuation of Ser. No. 619,299, Jun. 11, 1984, abandoned.

[30] Foreign Application Priority Data

Jun. 17, 1983 [JP] Japan ............................ 58-92049[U]
Sep. 26, 1983 [JP] Japan ........................... 58-147684[U]

[51] Int. Cl.⁴ ........................ H01M 9/36; H01M 2/16
[52] U.S. Cl. .................................... 429/105; 429/146; 429/147; 429/192
[58] Field of Search ................... 429/15, 27, 29, 101, 429/105, 143, 146, 147, 192

[56] References Cited

U.S. PATENT DOCUMENTS

| | | | |
|---|---|---|---|
| 4,105,829 | 8/1978 | Venero | 429/15 |
| 4,218,521 | 8/1980 | Putt et al. | 429/101 X |
| 4,343,868 | 8/1982 | Putt | 429/105 X |
| 4,346,150 | 8/1982 | Bellows et al. | 429/34 X |
| 4,396,689 | 8/1983 | Grimes et al. | 429/105 |

Primary Examiner—Brian E. Hearn
Assistant Examiner—Stephen J. Kalafut
Attorney, Agent, or Firm—Fleit, Jacobson, Cohn & Price

[57] ABSTRACT

A secondary battery prevents a localized formation of dendritic metal zinc during a charging and increases a current efficiency as far as possible. The secondary battery includes a negatively active material of a metallic ion, a positive electrode, a negative electrode and a separator having an metallic-ion-permeable sheet, a plurality of projections formed with a nonsymmetrical shape on opposite sides of the sheet and a diffusing means for diffusing a flow of zinc ion current flowing around the projection, and the diffusing means is provided in a vicinity of a connecting portion of the sheet and the projection.

13 Claims, 14 Drawing Figures

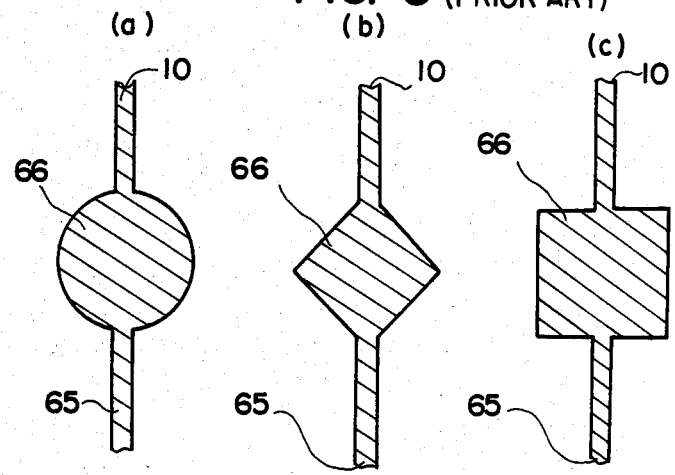
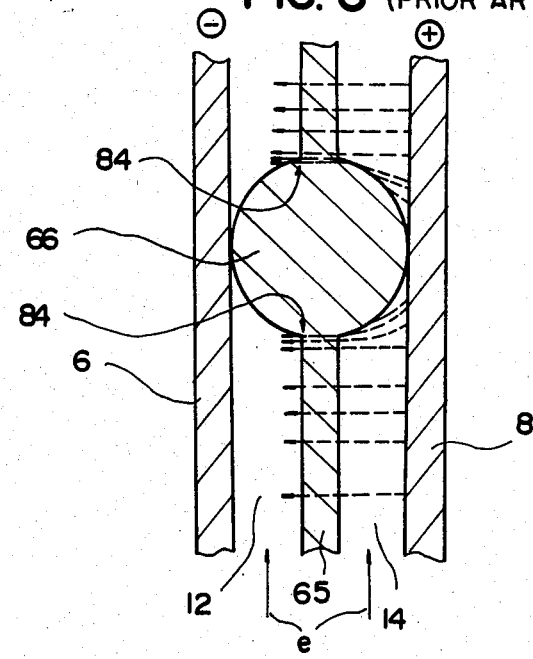

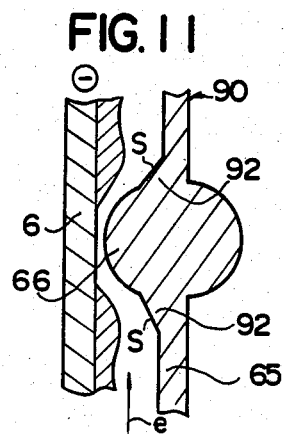 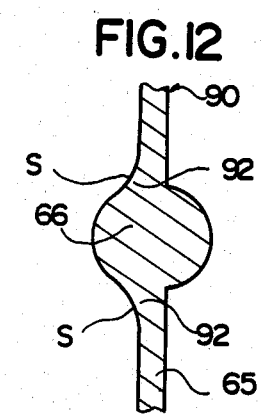 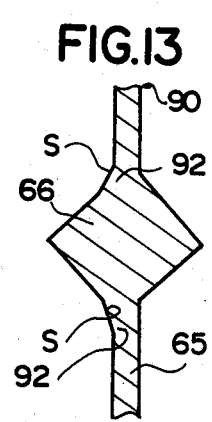
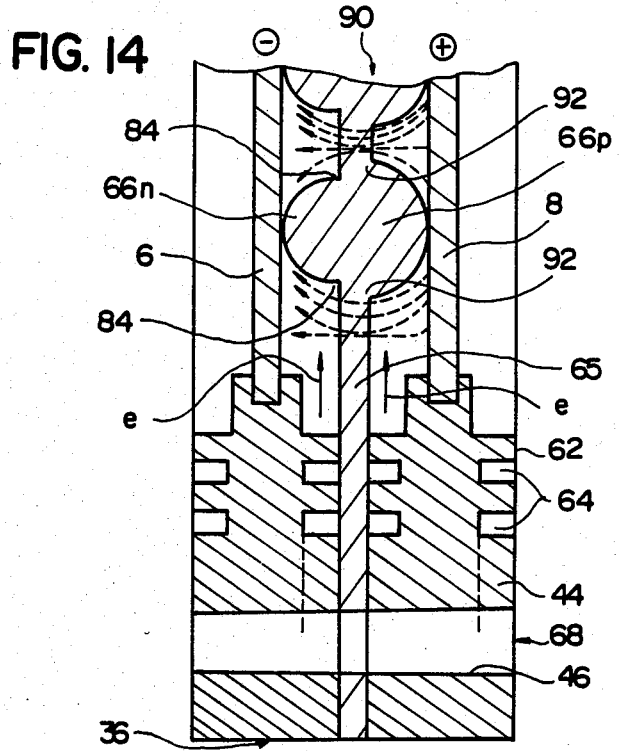

SECONDARY BATTERY HAVING A SEPARATOR

This application is a continuation of application Ser. No. 619,299, filed June 11, 1984, now abandoned.

BACKGROUND OF THE INVENTION

The present invention relates to a secondary battery having a separator and more particularly to a cell stack zinc-halogen secondary battery.

The cell stack zinc-halogen secondary battery is composed of a stacking of the unit secondary cells, an electrolyte circulation system and the electrolyte storage tanks.

Each secondary unit cell is constructed of a negative electrode chamber and a positive electrode chamber divided by a separator and both chambers are filled with the electrolyte.

The electrolyte circulation system includes a negative electrolyte circulation system and a positive electrolyte circulation system. The negative electrolyte circulation system is arranged so that the negative electrolyte is exited from each negative electrode chamber of the unit secondary cells and collected, and then the negative electrolyte is returned to the negative electrode chambers through a negative electrolyte storage tank thereby circulating the negative electrolyte. The positive electrolyte circulation system is arranged so that in the like manner as the negative electrolyte circulation system, the positive electrolyte is exited from each positive electrode chamber of the unit secondary cells and collected, and then the positive electrolyte is again returned to the positive electrode chambers through a positive electrolyte storage tank thereby circulating the positive electrolyte.

The negative electrolyte circulation system includes a pump for circulating the negative electrolyte and the negative electrolyte storage tank for storing the negative electrolyte. Also, in the like manner as the negative electrolyte circulation system, the positive electrolyte circulation system includes a pump for circulating the positive electrolyte and the positive electrolyte storage tank for storing the positive electrolyte.

A plurality of projections are formed on the opposite sides of the separator for separating negative and positive electrodes thus forming a given space between the separator and the negative electrode and between the separator and the positive electrode, respectively. The separator consists of an ion permeable sheet which permeates only zinc ions.

The negative electrolyte consists of an aqueous solution of zinc bromide and the positive electrolyte consists of an aqueous solution of zinc bromide in which the bromine molecules are dissolved.

With this cell stack zinc-halogen secondary battery, the following oxidation-reduction reactions take place during the periods of charging and discharging.

More specifically, during the charging period the zinc ions in the negative electrode chamber and/or the positive electrode chamber are attracted to the negative electrode so that the zinc ions are furnished with electrons and reduced to metal zinc thus depositing as metal zinc on the surface of the negative electrode. In this case, the zinc ions in the positive electrode chamber are passed through the separator and attracted to the negative electrode. Also, the bromine ions in the positive electrode chamber are attracted to the positive electrode so that the bromine ions lose electrons and are oxidized into bromine molecules thus depositing as bromine molecules on the surface of the positive electrode. The bromine molecules oxidized and deposited on the surface of the positive electrode are dissolved into the positive electrolyte. The bromine molecules are not permeable through the separator and therefore the bromine molecules are retained in the positive electrolyte.

During the discharging period, the metal zinc on the negative electrode surface are oxidized and converted to the zinc ions so that the zinc ions enter the negative electrolyte while leaving the electrons at the negative electrode and thus a part of the zinc ions is passed through the separator into the positive electrolyte. On the other hand, the bromine molecules in the positive electrolyte are reduced and converted to bromine ions on the surface of the positive electrode.

Then, since the separator is formed with the plurality of projections on the opposite sides as mentioned previously, during the charging period the flow of zinc ions tends to concentrate around the projections in the negative electrode side and thus the localized formation of dendritic metal zinc tends to occur at the portions of the negative electrode surface which are opposite to the adjacent portions of the projections. Then, the dendritic metal zinc is low in mechanical strength and therefore there is the danger of its forward end breaking off thus deteriorating the ratio of the amount of current produced by the discharging to the amount of current required for the charging (hereinafter referred to as a current efficiency). Moreover, there is the danger of the dendritic metal zinc growing excessively and breaking through the separator thus causing the positive electrolyte to enter the negative electrode chamber which causes a self-discharge and thereby deteriorates the current efficiency. Also, there is the danger of the dendritic metal zinc breaking through the separator short-circuiting to the positive electrode and making the secondary battery inoperable.

SUMMARY OF THE INVENTION

A primary object of the present invention provides a secondary battery employing a separator of the type designed to ensure as high a current efficiency as possible.

The separator used with this invention includes an ion permeable sheet, a plurality of projections formed with a nonsymmetrical shape on the opposite sides of the sheet and a diffusing means for diffusing the flow of a zinc ion current flowing around the projections, the diffusing means being provided in the vicinity of one connecting portion of the sheet with the projections and the separator is arranged between a positive electrode and a negative electrode of the secondary battery to define its positive electrode and negative electrode chambers. In accordance with this invention, the flow of zinc ion current flowing around the projections is diffused and the localized growth of dendritic metal zinc is suppressed thereby accomplishing the above-mentioned object.

More specifically, the separator of this invention uses an ion-exchange membrane or a fine porous membrane for its ion permeable sheet. Further, the diffusing means comprises a gentle slope provided at one side connecting portion between the sheet and the projections. The slope is a straight or curved slope. In this case, since one side connecting portion is provided by the diffusing means, the pour characteristics of resin material into a metal mold is improved and the production of the separator is facilitated in a molding process of the separator. The straight slope forms an angle of 10 to 40 degrees with the sheet surface and the height of the diffusing means is between ¼ and ⅔ of the height of the projection. In this case, particularly the flow of zinc ion current flowing around the projections is diffused satisfactorily and the current efficiency is improved. Further, the projections are formed nonsymmetrically with respect to the sheet and the projection on the positive electrode chamber side has a base area greater than that of the projection on the negative electrode chamber side thereby providing the diffusing means.

The above and other objects, features and advantages of the present invention will become apparent from the following detailed description taken with the accompanying drawings.

BRIEF DESCRIPTION OF THE DRAWINGS

FIG. 5(a), (b) and (c) is the partial sectional view of the conventional separators.

FIG. 6 is a diagram showing the manner in which zinc ion current flows when the conventional separator is used.

FIG. 11 is a diagram showing the manner in which metal zinc deposits when the separator of the present invention is used.

FIGS. 12 and 13 are partial sectional views showing other examples of the separator used with the present invention.

FIG. 14 is a diagram showing the manner in which zinc ion current flows when still another example of the separator of the present invention is used.

DESCRIPTION OF THE PREFERRED EMBODIMENTS

While the secondary battery of the present invention is susceptible of numerous physical embodiments, depending upon the environment and requirements, substantial number of the herein shown and described embodiments have been made, tested and used, and all performed in an eminently satisfactory manner.

Figure 1:
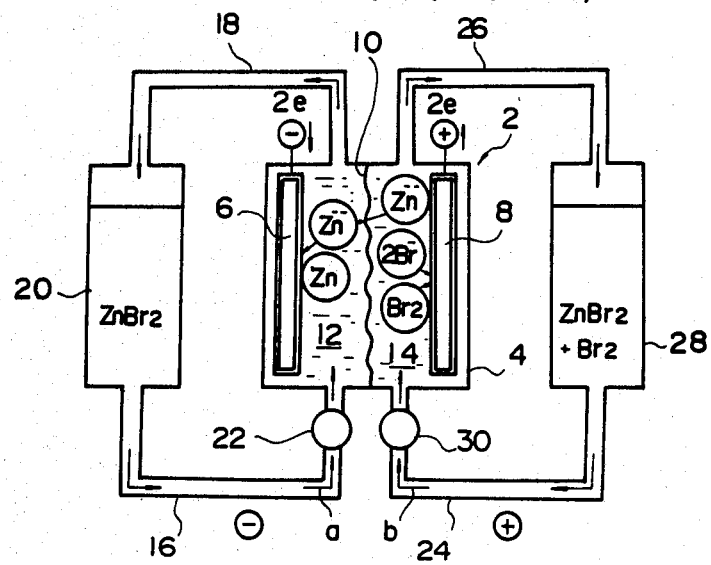
FIG. 1 is a diagram schematically showing the construction of a unit cell of a conventional zinc-halogen secondary battery.

FIG. 1 illustrates a diagram showing schematically the construction of a unit cell of a conventional zinc-halogen secondary battery. In the Figure, numeral 4 designates a secondary battery including a negative electrode 6 and a positive electrode 8 opposing each other and a separator 10 which divides the space between the former.

A negative electrode chamber 12 is provided with a negative electrolyte supply path 16 for supplying a negative electrolyte and a negative electrolyte exit path 18 for exiting the negative electrolyte and the negative electrolyte supply path 16 and the negative electrolyte exit path 18 are connected to a negative electrolyte storage tank 20 for storing the negative electrolyte externally of the secondary battery 4. Also, the negative electrolyte supply path 16 is provided with a negative electrolyte circulating pump 22 for circulating the negative electrolyte in the direction of arrows a.

On the other hand, in the like manner as the negative electrode chamber 12, a positive electrode chamber 14 is provided with a positive electrolyte supply path 24 for supplying a positive electrolyte and a positive electrolyte exit path 26 for exiting the positive electrolyte, and the positive electrolyte supply path 24 and the positive electrolyte exit path 26 are connected to a positive electrolyte storage tank 28 externally of the secondary battery 4. Also, the positive electrolyte supply path 24 is provided with a positive electrolyte circulating pump 30 for circulating the positive electrolyte in the direction of arrows b.

The negative electrolyte is an aqueous solution of zinc bromide and the positive electrolyte is an aqueous solution of zinc bromide in which the bromine molecules are dissolved. Also, a bromine complexing agent consisting of quaternary ammonium salt or the like is added to the positive electrolyte so as to separate bromine molecules produced upon charging from the aqueous solution.

Figure 2:
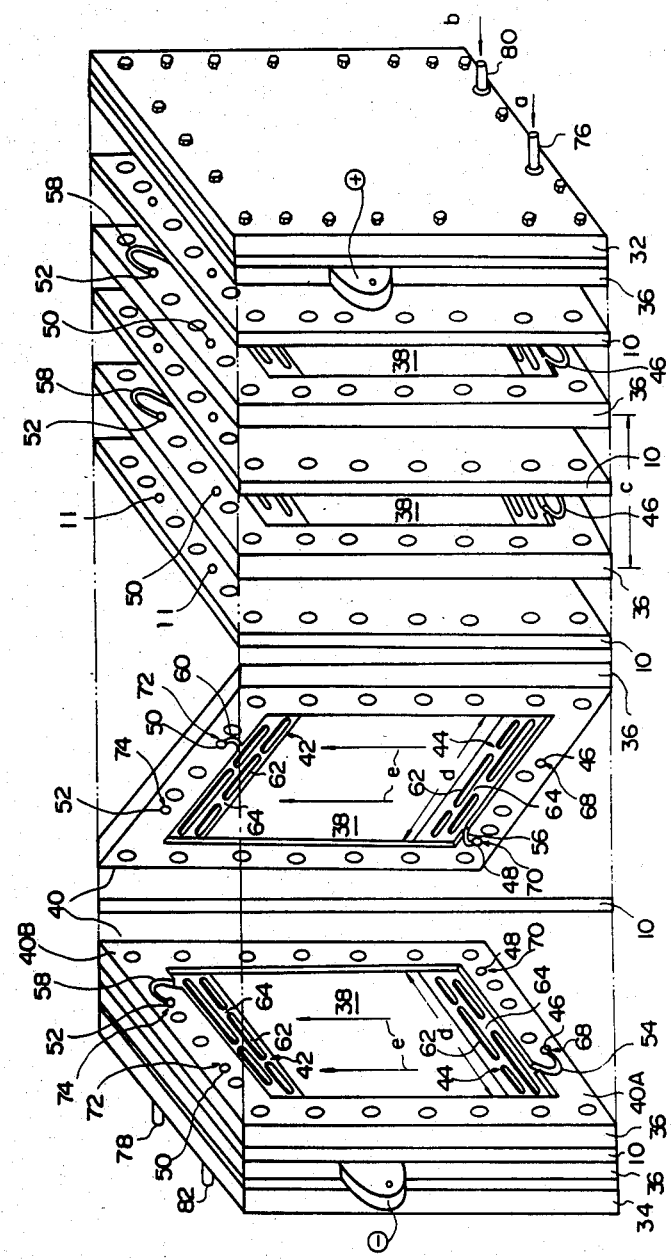
FIG. 2 is a perspective exploded diagram of a cell stack zinc-halogen secondary battery.

In fact, as shown in the schematically exploded diagram of FIG. 2, a practical secondary battery 2 includes a plurality of the unit cells of the secondary battery 4 stacked up. In the Figure, the extent indicated by arrows c shows the extent of one unit secondary battery. Two clamp plates 32 and 34 are respectively attached to the opposite sides (the right and left ends in the Figure) of the practical secondary battery 2 to hold it therebetween and the plurality of the unit cells of the secondary battery 4 and the clamp plates 32 and 34 are stacked up as a unit with clamping means such as bolts and nuts.

Numeral 36 designates an electrode plate and each electrode plate 36 includes a plate-shaped electrode 38, an electrode frame 40 having electric insulation and electrolyte nonpermeability, and supporting the electrode 38 at its four sides and an upper and lower flow rectifiers 42 and 44 which are each mounted on the opposite side surfaces of the electrode 38. A lower part 40A of the electrode frame 40 is formed therethrough with a first hole 46 and a second hole 48, and an upper part 40B of the electrode frame 40 is formed therethrough with third hole 50, and a fourth hole 52. The first hole 46 and the fourth hole 52 and the second hole 48 and the third hole 50 are respectively arranged near the extensions of the diagonal lines of the electrode 38. In a bipolar electrode one side of the plate-shaped electrode 36 (the left side in FIG. 2) is the positive electrode 8, then another side (the right side in FIG. 2) is negative electrode 6. The lower part 40A of the electrode frame 40 is also formed with a first channel 54 connecting negative electrode chamber 12 with the first hole 46, and a second channel 56 connecting the positive electrode chamber 14 with the second hole 48. The upper part 40B of the electrode frame 40 is also formed with a fourth channel 58 connecting the negative electrode chamber 12 with the fourth hole 52 and a third channel 60 connecting the positive electrode chamber 14 with the third hole 50.

Each of the upper and lower flow rectifiers 42 and 44 is formed on its surface with a plurality of elongated projections 62 so as to cause the negative or positive electrolyte to flow in a uniformly scattered manner in the direction of arrows e within the extent indicated by arrows d and thus microchannels 64 are formed among the projections 62 so as to cause the negative or positive electrolyte to flow divergently.

Figure 3:
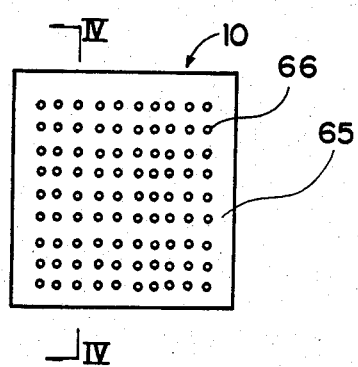
FIG. 3 is a plan view of a conventional separator.
Figure 4:
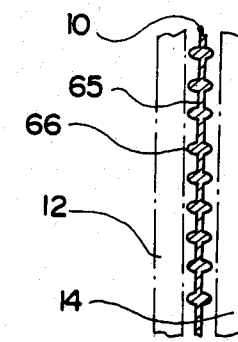
FIG. 4 is a sectional view taken along the arrowed line IV—IV of FIG. 3.

As shown in the plan view of FIG. 3 and the sectional view of FIG. 4, each separator 10 includes an ion permeable sheet 65 and a plurality of independent projections 66 spaced in perpendicular directions on the sheet 15 short distances from one another, and the projections 66 are formed on the opposite sides of the sheet 65 at the symmetrical or nonsymmetrical positions with respect thereto. The projections 66 are formed with symmetrical shapes into a semi-spherical, conical or columnar shape as shown in the sectional view of FIG. 5(a), (b) or (c). The material of the sheet 65 may for example be a fine porous membrane or ion-exchange membrane. The separator 10 is formed therethrough with four holes 11 aligned with the holes 46, 48, 50 and 52 of the electrode frame 40. When the electrode plates 36 and the separators 10 are stacked up, the first to fourth holes 46, 48, 50 and 52 of the electrode plates 36 and the holes 11 of the separators 10 form first to fourth manifolds 68, 70, 72 and 74. The first manifold 68 is connected to a negative electrolyte supply pipe 76 at the clamp plate 32 on the right side of FIG. 2 and the fourth manifold 74 is connected to a negative electrolyte exit pipe 78 at the clamp plate 34 on the left side of FIG. 2. Also, the second manifold 70 is connected to a positive electrolyte supply pipe 80 at the clamp plate 32 and the third manifold 72 is connected to a positive electrolyte exit pipe 82 at the clamp plate 34.

The negative electrolyte supply pipe 76 is connected to the negative electrolyte supply path 16 and the negative electrolyte exit pipe 78 is connected to the negative electrolyte exit path 18. Also, the positive electrolyte supply pipe 80 is connected to the positive electrolyte supply path 24 and the positive electrolyte exit pipe 82 is connected to the positive electrolyte exit path 26.

Next, the function of the cell stack zinc-bromine secondary battery will be described.

The circulation of the electrolytes will be described first with reference to FIGS. 1 and 2. The negative electrolyte stored in the negative electrolyte storage tank 20 is supplied by the negative electrolyte circulating pump 22 to the first manifold 68 formed in the inner lower part of the practical secondary battery 2 through the negative electrolyte supply pipe 76. The negative electrolyte branches from the first manifold 68 to the first channel 54 formed in the electrode frame 40 of each electrode 36 so that the negative electrolyte is uniformly scattered within the extent indicated by the arrows d by the microchannels 64 formed on the flow rectifier 44 which is arranged beneath the face of the negative electrode 6 and the negative electrolyte flows uniformly over the face of the negative electrode 6 in the direction shown by the arrows e. The negative electrolyte is then converged uniformly by the microchannels 64 formed on the rectifier 42 which is arranged in a position above the face of the negative electrode 6 and thus the negative electrolyte is collected respectively from the negative electrode chambers 12 to the fourth manifold 74 through the fourth channels 58. The negative electrolyte is returned from the fourth manifold 74 to the negative electrolyte storage tank 20 through the negative electrolyte exit path 18 and it is recirculated.

The positive electrolyte is circulated in the like manner as the negative electrolyte. More specifically, the positive electrolyte stored in the positive electrolyte storage tank 28 is supplied by the positive electrolyte circulating pump 30 to the second manifold 70 formed in the inner lower part of the practical secondary battery 2 through the positive electrolyte supply path 24. Then, the positive electrolyte branches from the second manifold 70 to the second channel 56 formed in the electrode frame 40 of each electrode 36 so that the positive electrolyte is uniformly scattered within the extent indicated by the arrows d by the microchannels 64 formed on the flow rectifier 44 arranged in a position below the face of the positive electrode 8 and the positive electrolyte flows uniformly in the direction shown by the arrows e over the face of the positive electrode 8. The positive electrolyte is then converged uniformly by the microchannels 64 formed on the flow rectifier 42 arranged in a position above the face of the positive electrode 8 and thus the positive electrolyte is collected respectively from the positive electrode chambers 14 to the third manifold 72 through the third channel 60. Then, the positive electrolyte is returned from the third manifold 72 to the positive electrolyte storage tank 28 through the positive electrolyte exit path 26 and it is recirculated.

Next, the chemical reactions during the charging and discharging will be described with reference particularly to FIG. 1. Firstly, during the charging a negative voltage is applied to each negative electrode 6 and a positive voltage is applied to each positive electrode 8. The zinc ions in the negative electrode chamber 12 and/or the positive electrode, chamber 14 are attracted to the negative electrode, 6 so that the zinc ions are reduced and converted into metal zinc and the metal zinc is deposited on the surface of the negative electrode 6. In this case, the zinc ions in the positive electrode chamber 14 are passed through the separator 10 and attracted to the negative electrode 6. Also, during the charge the bromine ions in the positive electrode chamber 14 are attracted to the positive electrode 8 so that the bromine ions are oxidized and converted into bromine molecules on the surface of the positive electrode 8. These bromine molecules are trapped by the bromine complexing agent added to the positive electrolyte and are retained in the positive electrolyte storage tank 28. In this case, the bromine ions in the negative electrode chamber 12 do not permeate through the separator 10. This charging decreases the zinc ions and bromine ions in the positive electrolyte by the same equivalent amount.

During the discharging, the metal zinc on the surface of each negative electrode 6 is oxidized and converted into zinc ions and they are introduced into the negative electrolyte while leaving electrons on the negative electrode 6. On the other hand, the bromine molecules in the positive electrolyte are supplied with electrons so that they are reduced and converted into bromine ions.

Figure 7:
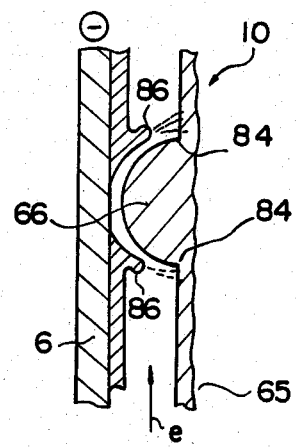
FIG. 7 is a diagram showing the manner of growth of dendritic metal zinc on the surface of a negative electrode.
Figure 8:
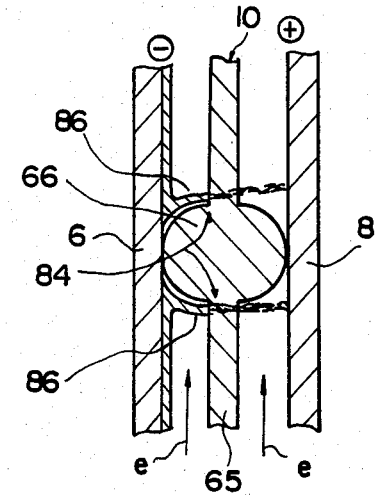
FIG. 8 is a diagram showing the manner in which dendritic metal zinc projections break through the separator.
Figure 9:
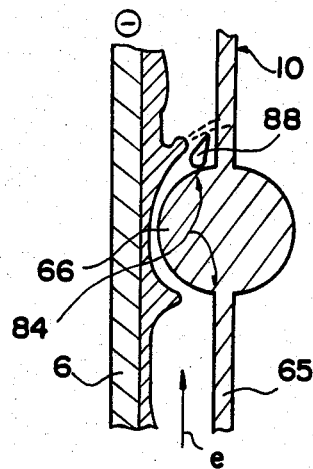
FIG. 9 is a diagram showing the manner in which a bubble is produced in the vicinity of the connecting portion between the dendritic metal zinc and the separator projection.
Figure 10:
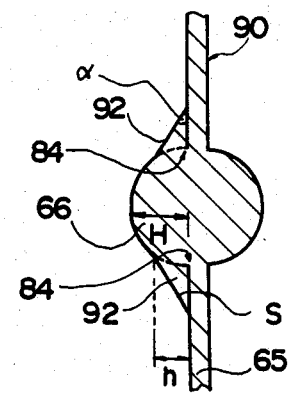
FIG. 10 is a partial sectional view of a separator used with the present invention.

As shown in FIG. 6, since the sheet 65, and the projections 66 of the separator 10 form with a symmetrical shaped acute connecting portion 84, during the charging the flow of zinc ions permeating the separator 10 and moving into the negative electrode chamber 12 from positive electrode chamber 14 tends to gather around each projection 66 and, as shown in FIG. 9, also the bubbles 88 gather at the upper part of the projection 66 thus making the flow of the negative electrolyte nonuniform. Thus, as shown in FIG. 7, on the surface of the negative electrode 6 facing the projection 66 the metal zinc is not deposited smoothly but it is deposited as dendritic metal zinc and grows locally. Since this dendritic metal zinc is low in mechanical strength, there is the danger of its forward end breaking off and thereby deteriorating the current efficiency. Also, as shown in FIG. 8 there is the danger of the dendritic metal zinc growing excessively and breaking through the separator 10, with the result that the positive electrolyte enters to negative electrode chamber 12 and thus a self-discharging is caused in which the bromine molecules in the positive electrolyte react with the metal, zinc on the surface of the negative electrode 6 thereby decreasing the current efficiency. There is another danger that the further growing dendritic metal zinc 86 breaking through the separator 10 short-circuit to the positive electrode 8 and the secondary battery is rendered inoperable.

The novel and useful secondary battery, separator used with the present invention will now be described with reference to FIGS. 10 to 14. In the Figures, numeral 90 designates a secondary battery separator used with the present invention and the separator 90 includes an ion permeable sheet 65, a plurality of projections 66 formed with a nonsymmetrical shape on the sheet 65 and a diffusing means 92 for diffusing the flow of zinc ion current flowing around each projection 66, and the diffusing means 92 is provided at the connecting portion 84 of the projection 66 and the sheet 65. As is clearly shown in the prior art FIGS. 6–9 and the FIGS. 11 and 14 of applicant's invention, each projection 66 has an outer portion adjacent (touching or essentially touching) the negative electrode 6. It is to be noted that the ion permeable sheet 65 may be comprised of the similar material as the conventional separators, e.g., a porous membrane or ion exchange membrane. Also, the nonsymmetrical shape of the projection 66 is not limited to the semi-spherical shape and they may be formed into a conical shape or columnar shape.

Since the secondary battery separator 90 includes the diffusing means 92 at the previously mentioned connecting portion 84, the flow of zinc ion current around the projection 66 is scattered so that the localized growth of metal zinc is prevented as shown in FIG. 11 and the current efficiency is prevented from being deteriorated.

When a separator with projections is made in a mold by means by a heat press, rolls or injection molding, in the case of the conventional separator the sheet 65 and the projection 66 form the symmetrical shaped acute connecting portion 84 and the pour characteristics of the resin material into the connecting portion 84 of a metal mold is not easy in a molding process of the separator thus making it difficult to produce a projection separator having a perfect molded shape. With the separator 90 of the present invention, the diffusing means 92 is provided to form a gentle slope S at each of the connecting portions 84 formed nonsymmetrically by the sheet 65 and the projections 66 so that the pour characteristics of a resin material into a mold is excellent in the molding process of the separator and it is easy to produce projection separator having a perfect molded shape.

The diffusing means 92 is provided nonsymmetrically on one of both the positive and negative electrode sides of the separator 90. On the negative electrode side, the diffusing means 92 is provided nonsymmetrically around the connecting portion 84 to slope straightly. An angle of inclination $\alpha$ of the diffusing means 92 should preferably in the range of 10° to 40° with respect to the surface of the sheet 65 and also the height h of the diffusing means 92 should preferably be in the range of $\frac{1}{4}$ to $\frac{2}{3}$ of the height H of the projection 66. Where the diffusing means 92 is formed nonsymmetrically, to have the dimensions in these ranges, particularly the flow of zinc ion current flowing around the projection 66 having the diffusing means 92 is diffused satisfactorily so that during the charging the deposition of dendritic zinc is prevented and the current efficiency is improved.

The diffusing means 92 is not limited to the straight slope S and it may take the form of a concavely curved slope S as shown in the sectional view of FIG. 12. Where each projection 66 having the diffusing means 92 is formed into the conical shape as shown in the sectional view of FIG. 5(b), the diffusing means 92 is formed with a conical shape having the slope S as shown in the sectional view of FIG. 13.

On the other hand, the diffusing means 92 on the positive electrode side is provided coaxially by nonsymmetrically forming the projections 66n and 66p on the opposite sides of the sheet 65 in such a manner that the projection 66p in the positive electrode chamber 14 has a base area greater than that of the projection 66n in the negative electrode chamber 12. In this case, as shown in the sectional view of FIG. 14, the diffusing means 92 is provided nonsymmetrically by the periphery of the bottom portion of the projection 66p in the positive electrode chamber 14 and the flow of zinc ion current flowing around the projections 66n in the negative electrode chamber 12 is diffused thereby preventing the deposition of dendritic zinc at around the projection 66n in the negative electrode chamber 12 and improving the current efficiency.

EXAMPLE 1

Conditions A includes the use of diffusing means in the form of the gentle slope at each of the connecting portions in the negative electrode side and conditions B uses no such diffusing means.

With both the conditions A and the conditions B, each projection has the semi-spherical shape, fixed projection height and fixed spacing, each sheet is made of porous membrane of a 1 mm thickness, the current density of charging or discharging is 20 mA/cm$^2$ and the charging and discharging times are respectively 8 h.

The results obtained are shown in the following Table 1.

TABLE 1

|  | Voltage efficiency (%) | Current efficiency (%) | Overall energy efficiency (%) |
|---|---|---|---|
| Conditions A | 86.62 | 88.43 | 76.60 |
| Conditions B | 85.03 | 76.44 | 65.00 |

From the above results it will be seen that while there is no great difference in the voltage efficiency between the conditions A and the conditions B, the current efficiency of the conditions A is higher than that of the conditions B by more than 10% and hence the overall energy efficiency (battery efficiency) is also higher by more than 10%.

EXAMPLE 2

Conditions C includes the use of coaxially symmetrical shaped projections and conditions D includes the use of coaxially nonsymmetrical shaped projections with the diameter of the base of the negative electrode side projection being selected as 2.4 mm and that of the positive electrode side projection being selected as 4 mm thereby producing a base connecting area between the positive electrode side projection and the sheet 65 about 2.8 times greater than the base connecting area between the negative electrode side projection and the sheet. As a result, as is apparent from FIG. 14, the base connecting area of each negative electrode side projection and the central portion of the base connecting area of the positive electrode side projection overlap, and the base connecting area of each positive electrode side projection includes an annular portion which is non-overlapping with respect to the base connecting area of the negative electrode side projection and which is defined by a portion of the separator sheet 65 extending circumferentially with respect to the connecting base area of the negative electrode side projection.

With both the conditions C and the conditions D, each projection has a semi-spherical shape, a fixed height and a projection spacing of $\sqrt{2}/2$ cm on a square arrangement, each sheet is made of polyolefin porous membrane having a thickness of 1 mm, the current density of charging or discharging is 20 mA/cm$^2$, the charging and discharging times are respectively 8 h and the number of charging and discharging cycles is 20.

The results obtained are shown in the following Table 2.

TABLE 2

|  | Voltage efficiency (%) | Current efficiency (%) | Overall energy efficiency (%) |
| --- | --- | --- | --- |
| Conditions C | 85.03 | 76.44 | 65.00 |
| Conditions D | 84.61 | 88.85 | 75.18 |

From the above results it will be seen that the voltage efficiency is slightly lower in the case of the conditions D than in the case of the conditions C. This appears to be due to the fact that the base area of the projection on the positive electrode side is greater in the case of the conditions D than in the case of the conditions C and that the effective area of the separator is smaller in the case of the conditions D than in the case of the conditions C. It will also be seen that the current efficiency of the conditions D is higher by more than 10% than that of the conditions C and hence the overall energy efficiency is also higher by more than 10%. It is to be noted that the disassembly of the secondary battery after the experiments under the conditions D showed that the electrodeposition of metal zinc on the surface of the negative electrodes was uniform and there was no formation of the metal zinc dendrites. Moreover, the separators showed no abnormality.

What is claimed is:

1. In a secondary battery having a negatively active material generating a metallic ion, a positively active material, a positive electrode, a negative electrode, a separator and diffusing means, said separator being provided with a metallic ion permeable sheet and a plurality of projections, said separator being disposed between said positive and negative electrodes and defining a positive electrode chamber filled with a positive electrolyte and a negative electrode chamber filled with a negative electrolyte, said projections including said diffusing means and being located in said negative electrode chamber, and said diffusing means being adapted to diffuse a current of said metallic ion permeating said sheet from said positive electrode chamber to said negative electrode chamber, the improvement wherein each of said projections comprises:

an outer portion adjacent a surface of said negative electrode and a diffusing means portion between said outer portion and said sheet, said outer adjacent portion and said diffusing means portion having, respectively, a circular cross section, and a peripheral surface of said outer adjacent portion being connected concavely to a peripheral surface of said diffusing means portion;

said diffusing means portion being located at a connecting portion of said projection and said sheet, and a peripheral surface of said diffusing means portion being provided with a sloping plane; and said sloping plane having an angle in a range of 10° to 40° with respect to the surface of said sheet and having a height in a range of ¼ to ⅔ of a height of said projection.

2. A secondary battery according to claim 1, wherein said projections are each formed into a semi-spherical sectional shape.

3. A secondary battery according to claim 1, wherein said projections are each formed into a conical shape.

4. A secondary battery according to claim 1, wherein said projections are each formed into a columnar shape.

5. A secondary battery according to claim 1, wherein said sheet is a fine porous membrane.

6. A secondary battery according to claim 1, wherein said sheet is an ion-exchange membrane.

7. In a secondary battery, having a negative material generating a metallic ion, a positive active material, a positive electrode, a negative electrode, a separator and diffusing means, said separator being provided with a metallic ion permeable sheet and a plurality of independent projections spaced in perpendicular directions on the sheet short distances from one another, said separator being disposed between said positive and negative electrodes and defining a positive electrode chamber filled with a positive electrolyte and a negative electrode chamber filled with a negative electrolyte, said diffusing means being adapted to diffuse a current of said metallic ion permeating said sheet from said positive electrode chamber to said negative electrode chamber, the improvement wherein said diffusing means comprises said projections being connected coaxially and non-symmetrically with opposite positive electrode and negative electrode sides of said sheet; and wherein each of said projections of said positive electrode side has a connecting base area connecting with said sheet which is greater than its coaxial projection of said negative electrode side of said sheet, the entire connecting base area of said negative side electrode projection and a central portion of the connecting base area of said positive electrode side projection overlapping, and the connecting base area of said positive electrode side projection including an anular portion which is non-overlapping with respect to the connecting base area of said negative electrode side projection and which is defined by a portion of said separator sheet extending circumferentially with respect to the connecting base area of said negative electrode side projection.

8. A secondary battery according to claim 7, wherein said connecting base area on the positive electrode side is about 2.8 times greater than said connecting base area on the negative electrode side.

9. A secondary battery according to claim 7, wherein said projections are each formed into a conical shape.

10. A secondary battery according to claim 7, wherein said projections are each formed into a columnar shape.

11. A secondary battery according to claim 7, wherein said sheet is a fine porous membrane.

12. A secondary battery according to claim 7, wherein said sheet is an ion-exchange membrane.

13. A secondary battery according to claim 7, wherein the projections are each formed into a semi-spherical shape.

* * * * *